April 5, 1955    S. B. BLACKMAN ET AL    2,705,397
FIRE RISK REDUCING MEANS FOR AIRCRAFT TURBINES
Filed April 12, 1952    6 Sheets-Sheet 1
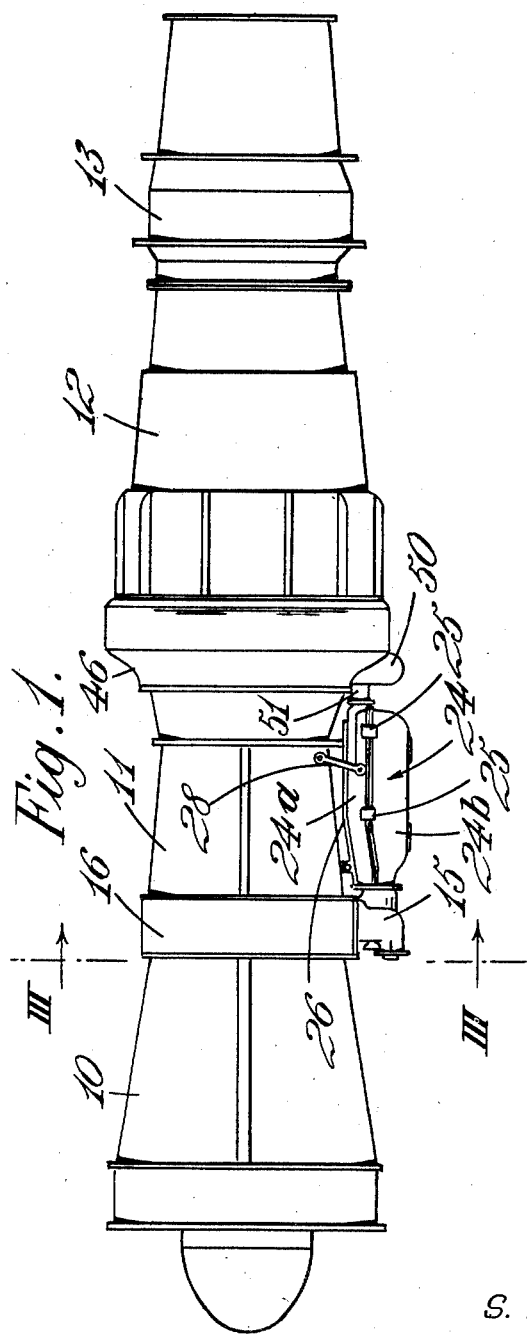
INVENTORS
S. B. BLACKMAN &
J. E. BELL
BY Wilkinson & Mawhinney
ATTYS.

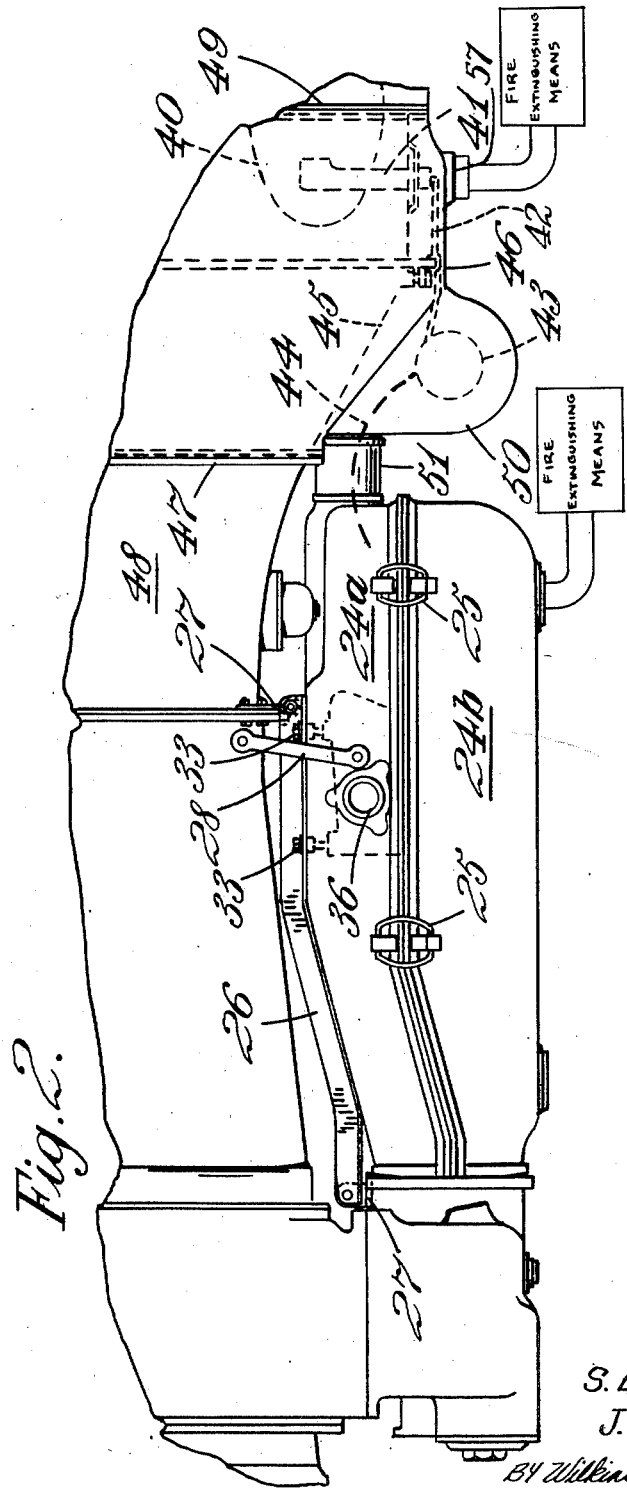

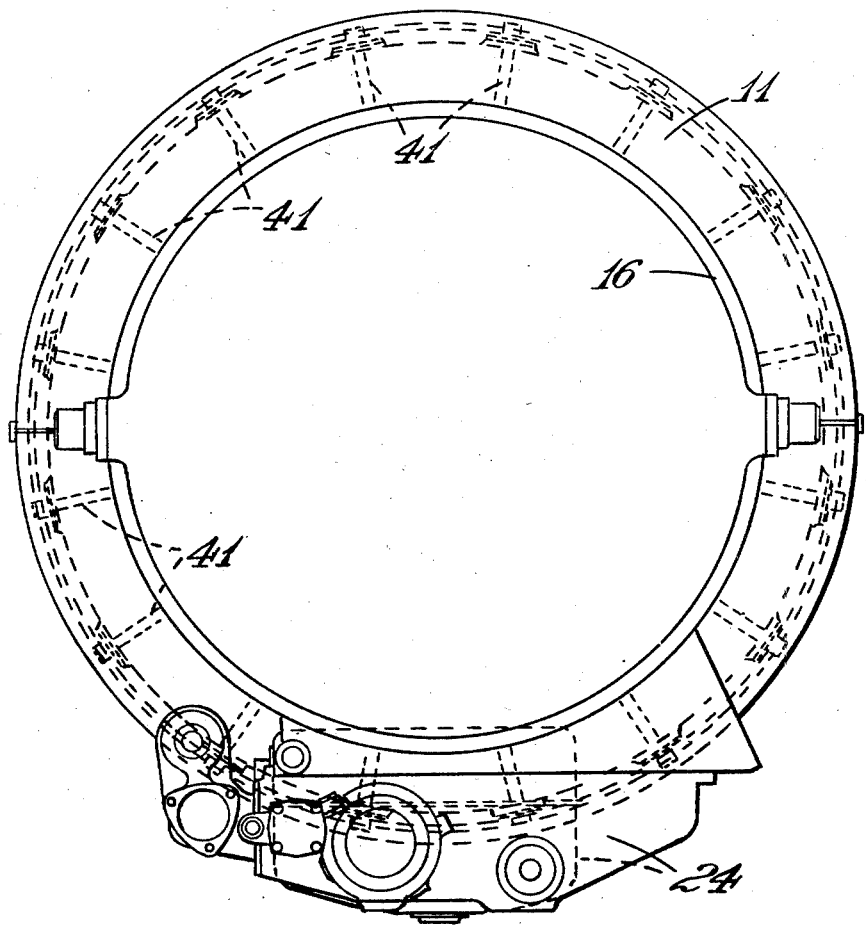

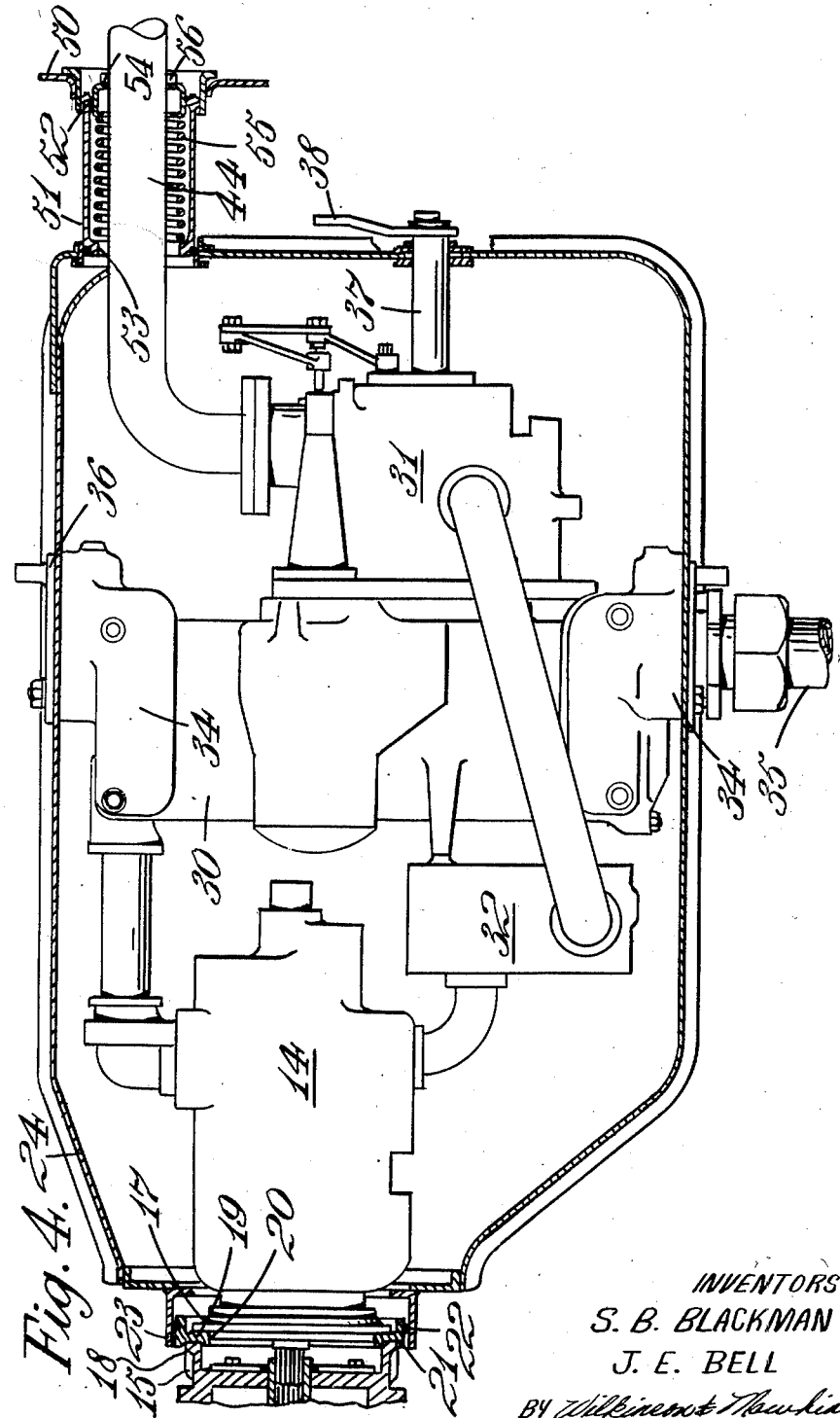

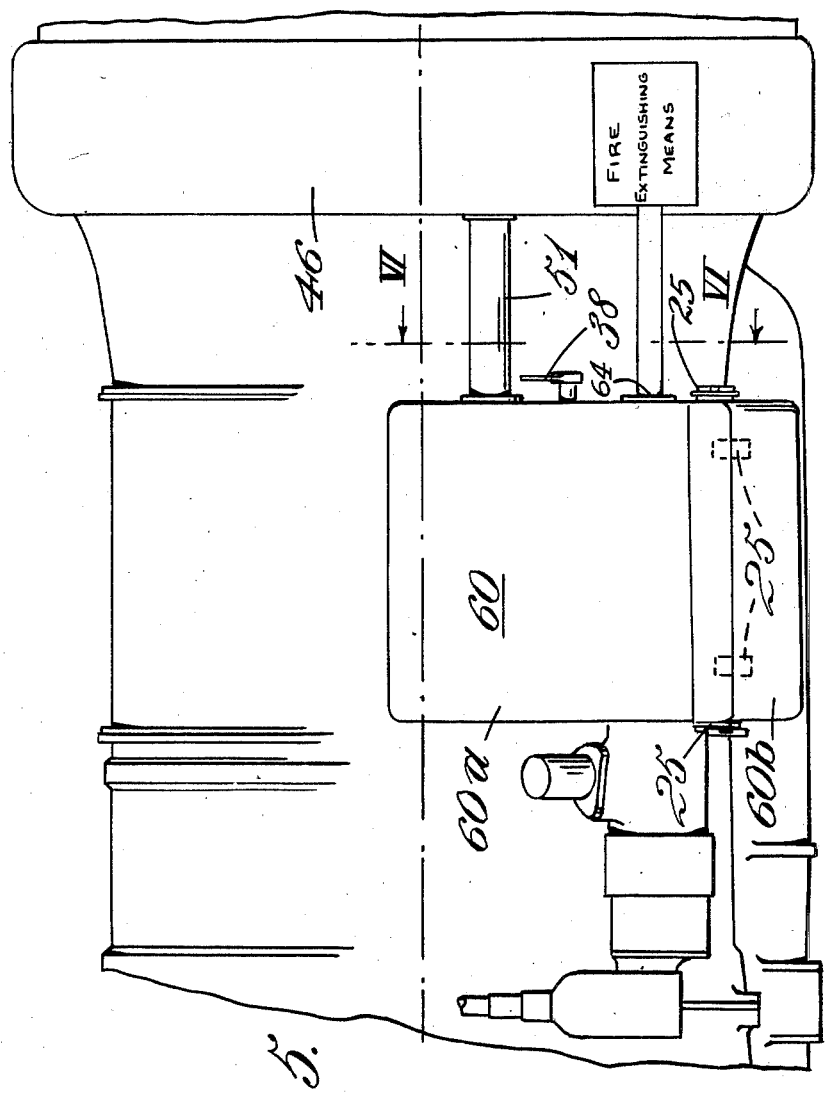

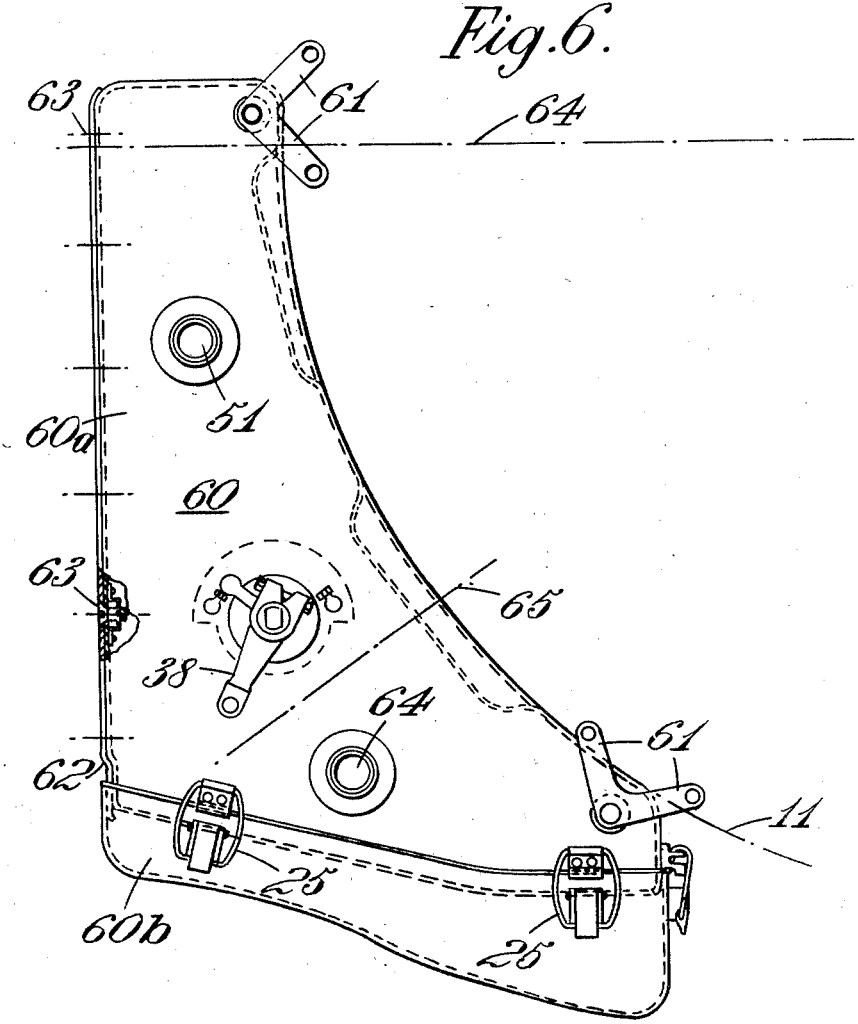

United States Patent Office 2,705,397
Patented Apr. 5, 1955

2,705,397

FIRE RISK REDUCING MEANS FOR AIRCRAFT TURBINES

Stuart Bertram Blackman, Westbury-on-Trym, near Bristol, and John Ernest Bell, Mangotsfield, near Bristol, England, assignors to The Bristol Aeroplane Company Limited, Bristol, England, a British company Application April 12, 1952, Serial No. 282,066

Claims priority, application Great Britain April 19, 1951

11 Claims. (Cl. 60—39.09)

This invention relates to fire risk reducing means for gas turbine engines for aircraft propulsion, the principal object of the invention being to prevent the indescriminate spread of liquid fuel in the event of leakage from the system due to breakage caused by material failure or accident.

According to one feature of the invention a casing is provided enclosing the fuel connections and distribution piping adjacent the highly heated external parts of the engine, such casing being adapted for connection to a source of fire extinguishing or fire-preventing medium.

According to another feature of the invention an additional casing is provided enclosing the fuel pump and control apparatus and the fuel piping from such pump and apparatus to the distribution piping referred to in the preceding paragraph. This casing thus encloses those parts of the fuel system which normally operate at a comparatively low temperature and a sealing diagram is preferably provided between it and the high temperature casing.

Two practical constructions of the invention will now be described, merely by way of example, with reference to the accompanying drawings whereof:

Figure 1 illustrates a jet propulsion engine of the compound axial-flow type incorporating fire-precaution apparatus in accordance with the invention, Figure 2 is a side elevation of the fire-precaution apparatus of Figure 1 and to a larger size, Figure 3 is a section on the line III—III of Figure 1 and to a larger size, Figure 4 is a sectional plan view of the casing enclosing the fuel pump and control apparatus and forming part of the apparatus of Figure 1, Figure 5 is a side elevation of part of a jet propulsion engine showing a second construction of fire-precaution apparatus in accordance with the invention, and Figure 6 is a sectional view of the apparatus of Figure 5 on the line VI—VI thereof.

Referring to Figure 1: the jet propulsion engine comprises in axial sequence from the forward end a low pressure compressor contained within stator casing 10, a high pressure compressor contained within stator casing 11, an annular combustion chamber 12 and a high and low pressure turbine contained within stator casing 13.

The fuel pump 14 (Figure 4) is mounted on the rear face of a lubricating oil sump 15 arranged below a casing 16 connecting the low and high-pressure compressors and containing gearing for driving the pump from the shaft of the compressor 11. Clamped between the base 17 of the fuel pump and facing 18 on the sump is a flat ring 19 having an inner flange 20 spigoting into the sump facing and an outer flange 21 carrying in a circumferential groove around its outer surface a rubber ring 22 of circular section. The rubber ring provides sealing for a cylindrical flange 23 projecting over it from the forward end of a sheet metal casing 24 which surrounds the pump and is of approximately rectangular shape in plan and elevation (Figures 2 and 3) with rounded corners and narrowing at the forward end to about the diameter of the cylindrical flange (Figure 4). The casing is divided into top and bottom parts 24a, 24b which are held together by a number of toggle type clips 25. The top surface of the casing is stiffened by two longitudinal angle members 26 which are pivoted at their forward ends to lugs 27 on the outer flange 21 of the flat ring 19 and at their rear ends to two short resilient support arms 27 bolted to compressor stator casing 11, this arrangement permitting expansion of the compressor casing relatively to the pump casing. The casing is suspended beneath compressor casing 11 by ring 19 at its forward end and by pivotal links 28 (Figure 2) towards its rear end.

The pump casing also contains a fuel filter 30 and flow and air/fuel ratio controllers 31, 32 respectively bolted together to form a unit which is bolted, at 33 Figure 2, to the angle stiffening members 26. The fuel filter extends transversely across the casing (see Figure 4) and has a fuel inlet 34 at each side, providing alternative connections for the main fuel supply pipe 35, one of the connections being normally blanked off, as at 36. From the flow control unit 31 a throttle shaft 37 extends rearwardly through the end of the casing 24 and carries a lever 38 for connection by a suitable transmission to a control lever at the pilot's station. By removing the lower half of the casing the fuel pump, filter and control apparatus are made easily accessible for servicing and inspection.

Fuel is supplied through the supply pipe 35 and flows through the filter 30 to the pump 14, and thence to the air fuel ratio controller 32 from which it passes to the flow controller 31 and thence to a pipe 44. The pipe 44 is connected to a distributor 43 which has a number of separate pipes 42 each of which passes fuel to one of a number of injectors 41 equally spaced around the combustion chamber 40, the injectors 41 spraying fuel into the combustion chamber. Since the combustion chamber casing 45 in the vicinity of the injectors and their supply pipes is comparatively hot, any leakage of fuel on to it, or the presence of vaporised fuel around it, creates a more serious fire risk than exists in the fuel pump casing 24, and these parts are therefore separately enclosed and divided from the pump casing by a gas-tight sealing diaphragm. The enclosure is effected by a sheet metal shrouding ring 46 bolted at its forward end to the flange 47 between the combustion chamber outer casing and the diffuser casing 48 which precedes it, and at its rear end to a flange 49 rearwardly of the injectors 41 between two sections of the combustion chamber casing. The shrouding ring is sufficiently large to enclose the outer ends of the injectors and fuel pipes leading to them (Figure 2), and towards the bottom, slightly to one side of the central vertical plane, is provided with an enlargement 50 to house the distributor to which the individual pipes are connected. A single pipe, part at least of which is flexible, passes from the distributor through a tubular tunnel member 51 (Figure 4) jointed at one end (52) to the shrouding enlargement 50 and at the other end (53) to the fuel pump casing. The joints 52, 53 are arranged to allow for a certain amount of universal movement, together with sliding movement at end 52, so that differential expansion of the various parts is fully allowed for. Within the tunnel member is a sliding piston-like member 54 urged by a coil spring 55 against a facing 56 provided on the single fuel pipe 44 so as to make a substantially gas-tight joint between the two casings. While the location of the distributor within the combustion chamber shrouding facilitates the provision of a seal between the two casings, there being only one pipe to pass through the seal, it is course possible to arrange the distributor within the fuel pump casing.

Fire extinguishing means is provided for supplying a fire extinguishing or preventing medium, such as methyl bromide into the shrouding around the combustion chamber (for example, as through the port at 57 in Figure 2), and also into the fuel pump casing 24. Such a system, one example of which is shown in British Patent Specification No. 561,663, is controlled in the usual manner by overheat, flame and crash sensitive devices.

The highly heated exhaust casing and jet pipe of the engine are preferably also provided with shrouds through which cool air is circulated by ram or extractor effect, so that all the hot portions of the engine are encased and the spread of fuel oil or vapour is prevented. The provision of isolating enclosures as part of the airframe structure is therefore unnecessary.

In the second construction illustrated in Figures 5 and 6 the casing 60 which encloses the fuel pump and flow and air/fuel ratio controllers is arranged to one side of the compressor 11 and substantially entirely below a horizontal plane 164 through the engine centre line (Figure 6). The casing 60 comprises an upper part 60a attached by brackets 61 to compressor casing 11 and a bottom part 60b removably secured to part 60a by toggle clips 25. The side panel 62 of part 60a is also removable on loosening the screws 63. The bottom part 60b is easily removable for servicing the equipment within casing 60 when the engine is installed in an aircraft while the side panel 62 is readily removable after the engine is removed from the aircraft, the aircraft structure normally preventing access to the panel. As in the first construction the casing 60 is connected with casing 46 by tunnel 51. The fire extinguishing or preventing medium is supplied to casing 60 through connector 64. The chain dotted line 65 indicates the centre line of the drive shaft from the engine to the fuel pump arranged within the casing 60.

We claim:

1. A gas turbine engine of the type having at least one fuel injector, a fuel supply system connected to said injector to supply fuel thereto, and parts adjacent said fuel injector, which parts are liable, during operation of the engine, to cause ignition of fuel coming into contact with them, characterized by the combination with said engine of a substantially gas-tight casing enclosing said parts and only that portion of the fuel system adjacent said parts, said substantially gas-tight casing having a port, and fire extinguishing means connected to said port to discharge therethrough into said casing.

2. A gas turbine engine of the type having at least one fuel injector, a fuel supply system connected to said injector to supply fuel thereto, and parts adjacent said fuel injector, which parts are liable, during operation of the engine, to cause ignition of fuel coming into contact with them, characterized by the combination with said engine of a substantially gas-tight casing enclosing said parts and only that portion of the fuel system adjacent said parts.

3. A gas turbine engine as claimed in claim 2 wherein said fuel system comprises a fuel pump, distribution piping adjacent said parts, fuel piping from said fuel pump to said distribution piping, and control apparatus for said fuel pump, and wherein said casing contains said distribution piping, said engine further comprising an additional substantially gas-tight casing enclosing said pump, said control apparatus, and said fuel piping and separating them from said parts.

4. A gas turbine engine as claimed in claim 3 wherein said additional substantially gas-tight casing has a port, and fire extinguishing means connected to said port to discharge therethrough into said additional casing.

5. A gas turbine engine as claimed in claim 3 further comprising a gas-tight joint connecting said casing and said additional casing.

6. A gas turbine engine as claimed in claim 5, wherein said gas-tight joint comprises a tubular member connected at one end to said casing in a gas-tight manner, and connected at its other end to said additional casing in a gas-tight manner, a single fuel pipe enclosed by said tubular member, a facing on said single fuel pipe, a piston slidable in said tubular member, and on single fuel pipe, and means to urge said piston against said facing to make said gas-tight joint.

7. A gas turbine engine as claimed in claim 3 wherein said engine further comprises a stator casing liable to expand and contract during operation, support means connected to said stator casing and carrying said additional casing suspended from said stator casing, said support means being of the kind which permits relative expansion and contraction between said stator casing and said additional casing.

8. A gas turbine engine as claimed in claim 7 wherein said support means comprises a part on said stator casing slidably supporting one end of said additional casing, and a resilient arm on said stator casing supporting the other end of said additional casing.

9. A gas turbine engine as claimed in claim 8 further comprising a gas-tight joint between said part of said support means and the end of said additional casing supported thereby.

10. A gas turbine engine as claimed in claim 8 further comprising a stiffening member attached to the surface of said additional casing adjacent said stator casing, said stiffening member being pivoted at one end to said resilient arm and at the other end to said stator casing.

11. A gas turbine engine as claimed in claim 10 in which said fuel pump and said control apparatus are carried by said stiffening member.

References Cited in the file of this patent

UNITED STATES PATENTS

| Number | Name | Date |
| --- | --- | --- |
| 2,015,995 | Egtvedt | Oct. 1, 1935 |
| 2,432,358 | Warner | Dec. 9, 1947 |
| 2,432,359 | Streid | Dec. 9, 1947 |
| 2,509,978 | Ksieski | May 30, 1950 |
| 2,546,034 | Lansing | Mar. 20, 1951 |
| 2,547,246 | Aspelin | Apr. 3, 1951 |

FOREIGN PATENTS

| Number | Country | Date |
| --- | --- | --- |
| 535,841 | Great Britain | Apr. 23, 1941 |